United States Patent
Kim et al.

(10) Patent No.: US 9,108,091 B1
(45) Date of Patent: Aug. 18, 2015

(54) GOLF CLUB WEIGHT SCREWS

(71) Applicant: CALLAWAY GOLF COMPANY, Carlsbad, CA (US)

(72) Inventors: Wee Joung Kim, Vista, CA (US); Patrick Dawson, San Diego, CA (US)

(73) Assignee: Callaway Golf Company, Carlsbad, CA (US)

( * ) Notice: Subject to any disclaimer, the term of this patent is extended or adjusted under 35 U.S.C. 154(b) by 106 days.

(21) Appl. No.: 13/913,098

(22) Filed: Jun. 7, 2013

Related U.S. Application Data

(63) Continuation-in-part of application No. 13/410,127, filed on Mar. 1, 2012, now Pat. No. 8,753,227.

(60) Provisional application No. 61/496,695, filed on Jun. 14, 2011.

(51) Int. Cl.
  *A63B 53/06* (2015.01)
  *F16B 37/14* (2006.01)
  *A63B 53/04* (2015.01)

(52) U.S. Cl.
  CPC .......... *A63B 53/06* (2013.01); *A63B 2053/0491* (2013.01); *F16B 37/14* (2013.01); *F16B 37/145* (2013.01)

(58) Field of Classification Search
  CPC .............................. F16B 37/14; F16B 37/145
  USPC ............... 473/334–339, 341; 411/373, 372.5, 411/372.6, 395, 396
  See application file for complete search history.

(56) References Cited

U.S. PATENT DOCUMENTS

| | | | |
|---|---|---|---|
| 4,085,934 A * | 4/1978 | Churchward | 473/338 |
| 6,773,360 B2 * | 8/2004 | Willett et al. | 473/334 |
| 2007/0212190 A1 * | 9/2007 | Monday et al. | 411/85 |
| 2013/0108395 A1 * | 5/2013 | Bourget et al. | 411/373 |
| 2013/0215381 A1 * | 8/2013 | Raghuprasad | 351/178 |
| 2013/0310192 A1 * | 11/2013 | Wahl et al. | 473/331 |

* cited by examiner

*Primary Examiner* — Benjamin Layno
(74) *Attorney, Agent, or Firm* — Rebecca Hanovice; Sonia Lari; Michael A. Catania

(57) ABSTRACT

A customizable weight screw for a golf club head having one or more weight ports is disclosed herein. A kit is also disclosed herein, the kit comprising a weight screw and a plurality of medallions that can be removably affixed to the weight screw.

18 Claims, 11 Drawing Sheets

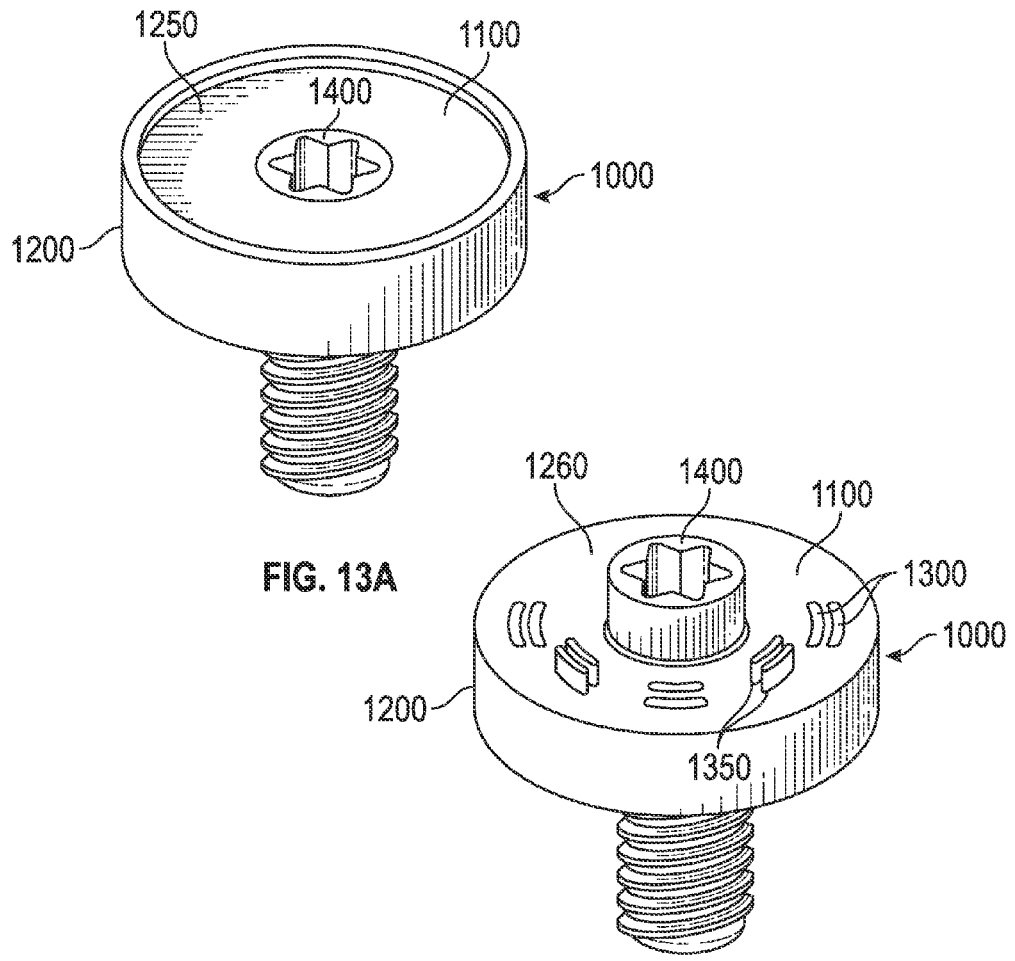
FIG. 13A
FIG. 13B
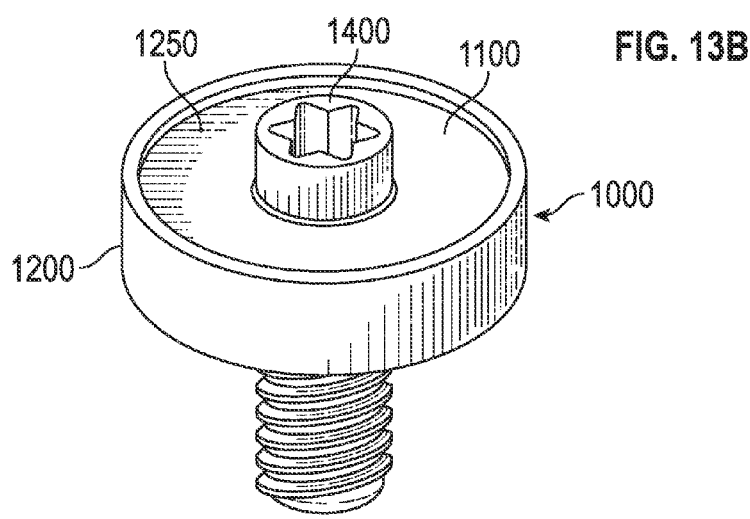
FIG. 13C

GOLF CLUB WEIGHT SCREWS

CROSS REFERENCES TO RELATED APPLICATIONS

The present application is a continuation-in-part of U.S. patent application No. 13/410,127, filed on Mar. 1, 2012, now U.S. Pat. No. 8,753,227, which claims priority to U.S. Provisional Patent Application Number 61/496,695, filed on May 18, 2011, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

1. Field of the Invention

The present invention relates to weight screws for use with a golf club having one or more weight ports.

2. Description of the Related Art

In recent years, golf consumers have become more interested in customizing their golf equipment. As such, many manufacturers have begun incorporating adjustable features into their golf clubs. One such feature is weighting, which can be adjusted through the use of removable or movable weights affixed to various regions of a golf club head or shaft. While there are several different kinds of golf club weight screws currently available on the market, many of these screws have structural weaknesses that can lead to breakage and thus require consumers to spend additional money replacing them.

BRIEF SUMMARY OF THE INVENTION

One aspect of the present invention is a customizable golf club weight screw that is sized such that it can be formed from a single material, particularly standard density high strength materials. The standard materials make it possible to form screws having different weights from a single material without sacrificing structural integrity. Another aspect of the present invention is a customizable, low-weight, structurally sound screw that incorporates at least two different types of materials.

Another aspect of the present invention is a weight screw for a golf club head having at least one weight port, the weight screw comprising a head, a medallion, and an extension portion comprising external threads, wherein the head comprises an upper portion sized to close the at least one weight port, and an engagement bore, wherein the extension portion is disposed beneath the upper portion, and wherein the upper portion comprises a recessed region sized to receive the medallion. In some embodiments, the head and the extension portion may be integrally formed. In other embodiments, the medallion may be composed of electroformed metal. In an alternative embodiment, the medallion may be composed of a non-metal material. In some embodiments, the extension portion may comprise a counterbore. In other embodiments, the medallion may be affixed within the recessed region with an adhesive material. In some further embodiments, the engagement bore may protrude from the upper portion.

Yet another aspect of the present invention is a weight screw for a golf club head having at least one weight port, the weight screw comprising a head, a medallion comprising a first plurality of mating features, and an extension portion comprising external threads, wherein the head comprises an upper portion sized to close the at least one weight port, and an engagement bore, wherein the extension portion is disposed beneath the upper portion, wherein the upper portion comprises an upper surface having a second plurality of mating features, and wherein the first plurality of mating features releasably mates with the second plurality of mating features to removably affix the medallion to the upper surface. In some embodiments, each of the first and second plurality of mating features may comprise a plurality of recesses and a plurality of protrusions. In other embodiments, the medallion may be composed of electroformed metal. In some embodiments, the extension portion may comprise a counterbore.

Another aspect of the present invention is a kit comprising a weight screw comprising a head and a threaded extension portion, and a plurality of medallions, wherein the head comprises an upper surface having the same shape and diameter as each of the plurality of medallions, wherein each of the plurality of medallions comprises a design feature that differs from a design feature of each of the other medallions, and wherein each of the plurality of medallions comprises means for removably fixing the medallion to the upper surface. In some embodiments, the cans for removably fixing the medallion to the upper surface may be selected from the group consisting of a plurality of mating features and a semi-permanent adhesive. In other embodiments, at least one of the plurality of medallions may be composed of electroformed metal, while in alternative embodiments, at least one of the plurality of medallions may be composed of a non-metal material.

In some embodiments, the design feature may be selected from the group consisting of a surface texture, a color, a pattern, and an image. In other embodiments, the threaded extension portion may comprise a counterbore. In some embodiments, the head may be integrally formed with the threaded extension portion. In some embodiments, the weight screw may be composed of a plurality of materials, while in alternative embodiments, the weight screw may be composed of a single metal material.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIGS. 13A, 13B, and 13C are side perspective views of fifth, sixth, and seventh embodiments of the present invention, respectively.

DETAILED DESCRIPTION OF THE INVENTION

Figure 1:
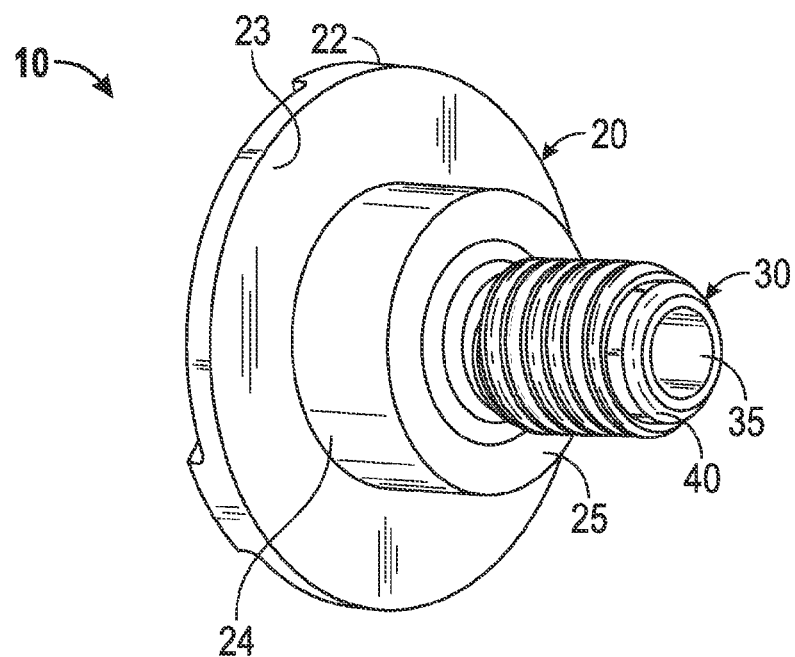
FIG. 1 is a side, perspective view of a first embodiment of the present invention.
Figure 2:
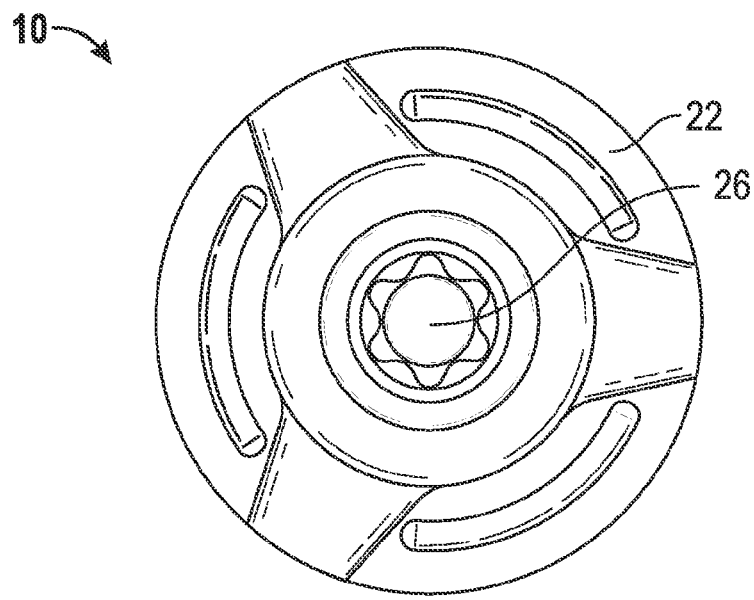
FIG. 2 is a top, plan view of the embodiment shown in FIG. 1.
Figure 3:
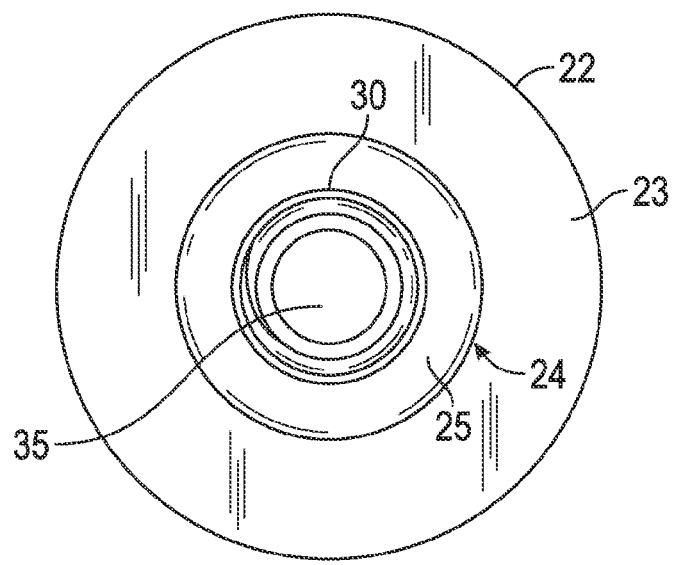
FIG. 3 is a bottom, plan view of the embodiment shown in FIG. 1.

The weight screws of the present invention are designed to help a golfer achieve discrete weighting goals in golf club heads without sacrificing structural integrity or negatively affecting cosmetic features of the screw.

Single Material Weight Screws

The single-material weight screw of the present invention is designed in such a way that it can be formed using common high strength materials. Adjustments to the volume of the screw change the overall weight of the screw without altering its appearance. These volume adjustments are made below the visible surface of the screw when it is engaged with a golf club head, which permits a manufacturer to create a set of screws, each of which has the same general appearance but a different overall weight. This design is unlike other screws in golf because it combines a single material with a variable portion for weight control. The outside of the screw looks the same to the consumer, which makes the look of the club consistent throughout different weight screw configurations.

A first embodiment of the present invention is shown in FIGS. 1-4. In this embodiment, the weight screw 10 is composed of a single material, preferably a metal, and may be cast, forged, machined, or made using another method known to a person of ordinary skill in the art. The weight screw is preferably between 0.25 and 1.5 inches in length L, and more preferably 0.63 inch long, and is made of a single metal material, including, but not limited to, aluminum alloy, titanium alloy, stainless steel, and tungsten, depending on the desired overall weight. For example, if a heavy weight screw 10 is desired, the weight screw 10 can be formed of tungsten or a tungsten alloy, and if weight screw is preferred, the weight screw 10 can be formed of an aluminum alloy.

The weight screw 10 of the present invention comprises a head 20 and a threaded extension portion 30. The head 20 has an upper portion 22 sized to fit snugly within a weight port in a golf club head (not shown) and to prevent water and debris from getting trapped within the weight port, and a cylindrical extension portion 24. The upper portion 22 includes an engagement bore 26 that receives a screwdriver head or torque wrench, and may also include cosmetic features to further enhance the overall appearance of the golf club head when the weight screw 10 is engaged with a weight port. In some embodiments, the engagement bore 26 is hexalobular and receives a torque wrench, such as one made by TORX®. The engagement bore 26 may be deep enough to extend into the cylindrical extension portion 24.

The cylindrical extension portion 24 extends from a lower surface 23 of the upper portion 22 of the head 20. The cylindrical extension portion itself has a lower surface 25 that rests against the bottom of a weight port (not shown) when the weight screw 10 is fully installed within the weight port.

The threaded extension portion 30 extends from the lower surface 25 of the cylindrical portion 24. This threaded extension portion 30 engages a threaded bore (not shown) in the weight port of the golf club head (not shown). The threaded extension portion 30 preferably has threads with the dimension M6×1.0. In some embodiments, the threaded extension portion 30 includes a counterbore 35 that hollows the interior of the threaded extension portion 30. The extension portion 30 further includes a tail portion 40 extending from the lowermost point of the extension portion 30 and encircling the counterbore 35.

The overall weight of the weight screw 10 of the present invention is modified by adjusting the volume of the weight screw 10. The volume, and thus the weight, of the weight screw 10 is adjusted according to the present invention without altering the cosmetics or dimensions of the engagement bore 26 of the upper portion 22 of the head 20 or the dimensions of the threaded extension portion 30.

Figure 4:
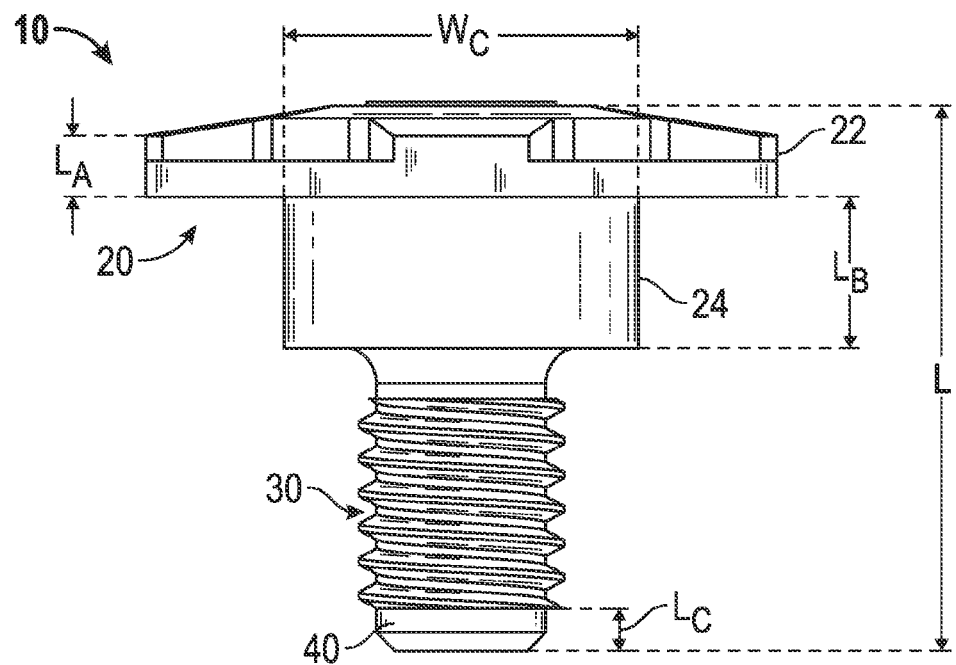
FIG. 4 is a side plan view of the embodiment shown in FIG. 1.

FIG. 4 shows thicknesses of the head upper portion 22, cylindrical portion 24, and tail portion 40, each of which can be varied to achieve different overall screw weights. For example, in a lighter weight screw 10, the thickness $L_A$ of the upper portion 22 of the head and the thickness $L_C$ of the tail portion 40 are decreased and the $L_B$ thickness of the cylindrical portion 24 is increased. For a heavier weight screw 10, the thickness $L_A$ of the upper portion 22 of the head and the thickness $L_C$ of the tail portion 40 are increased and the thickness $L_B$ of the cylindrical portion 24 is decreased. The embodiment shown in FIGS. 1-4, which has small thicknesses $L_A$ and $L_B$ and large thickness $L_C$, can be lightweight if it is made from an aluminum alloy or midweight if it is made from a stainless steel or titanium alloy.

Figure 5:
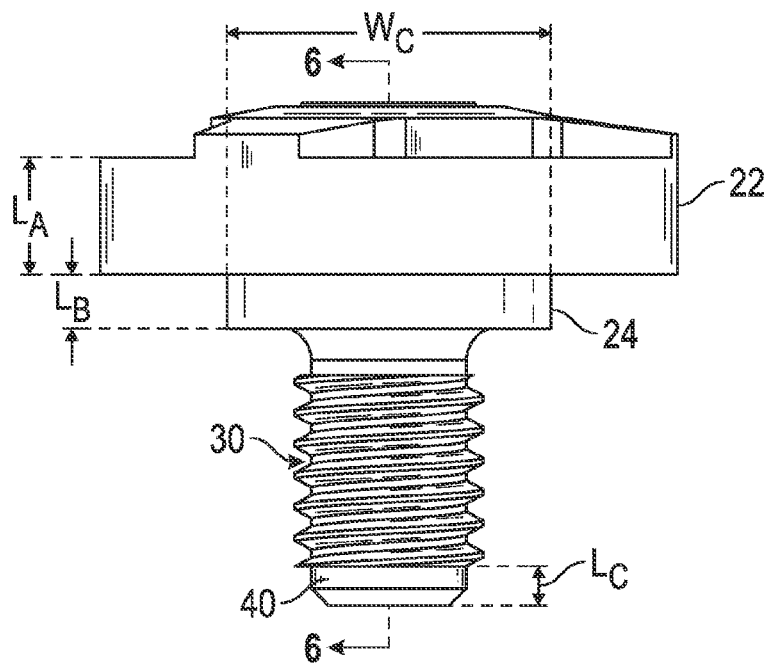
FIG. 5 is a side plan view of a second embodiment of the present invention.
Figure 6:
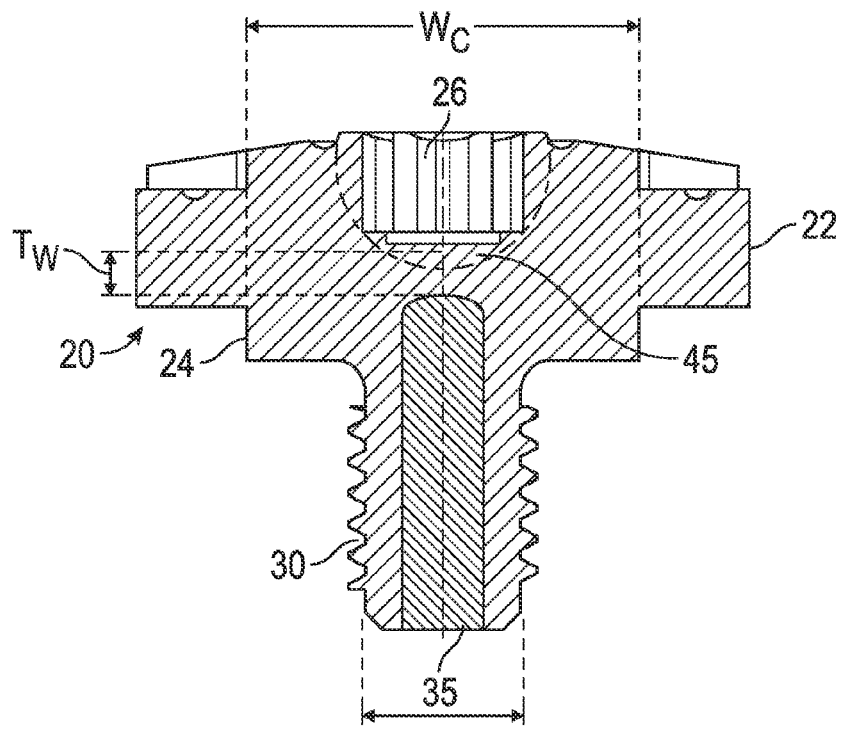
FIG. 6 is a cross-sectional view of the embodiment shown in FIG. 5 along lines 6-6.

FIGS. 5-6 show a version of the weight screw 10 of the present invention that is heavier than the embodiment shown in FIGS. 1-4 when it is made of the same material. In comparison with the embodiment shown in FIGS. 1-4, the dimension $L_A$ of the upper portion 22 is larger, the dimension $L_B$ of the cylindrical portion 24 is smaller, and the dimension $L_C$ of the tail portion 40 is approximately the same. The dimension $L_C$ of the tail portion 40 may be increased in order to further increase the weight of the screw. In order to increase the weight of this embodiment even further, the weight screw 10 can be formed of a tungsten alloy or another high density material. The counterbore 35 can also be removed to further increase the weight of this embodiment.

Figure 7:
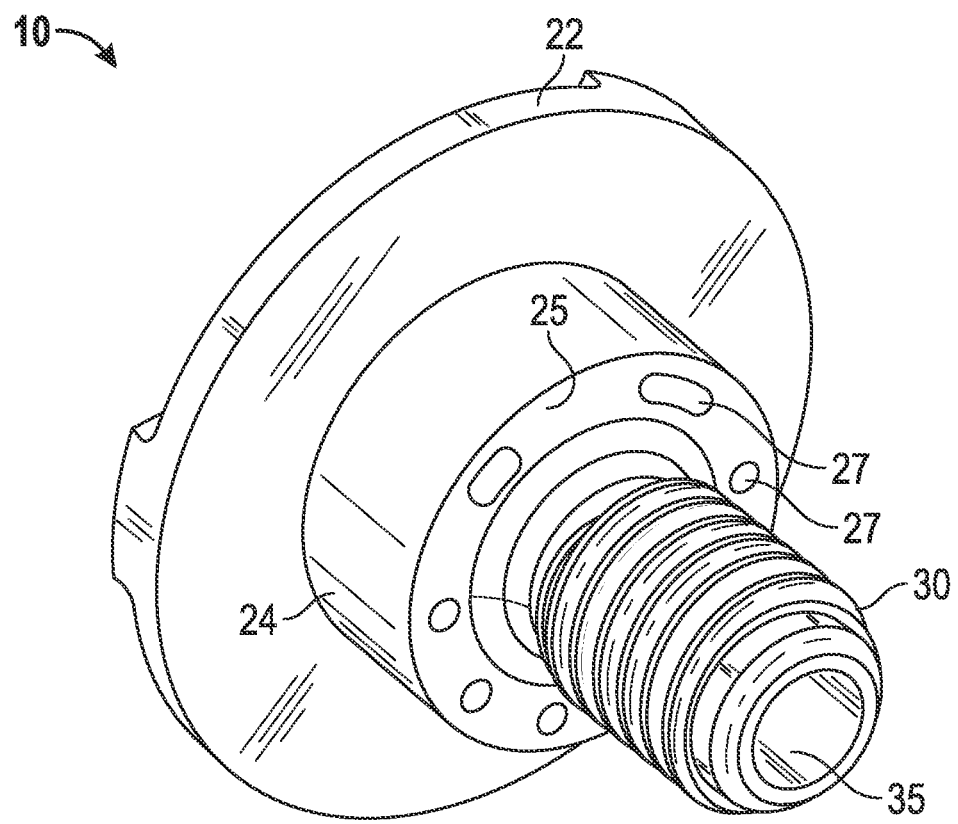
FIG. 7 is a side, perspective view of a third embodiment of the present invention.

For each of the embodiments disclosed herein, the overall weight of the weight screw 10 may be further adjusted by providing bores or holes 27 in the cylindrical portion 24, as shown in FIG. 7. These holes 27, which remove mass from the cylindrical portion 24 of the weight screw 10, may be any shape, including oblong, polygonal, or circular. The weight screw 10 may include any number of holes 27 depending on the overall weight desired. The holes 27 can be machined, drilled, or cast into the weight screw 10, or may be created through any other methods known to a person of skill in the art. Increasing or decreasing the size and volume of the counterbore 35, or removing it from the weight screw 10 completely, also permits greater control over the screw weight, as does increasing or decreasing the depth of the engagement bore 26 into the head 20 of the weight screw 10.

Figure 8:
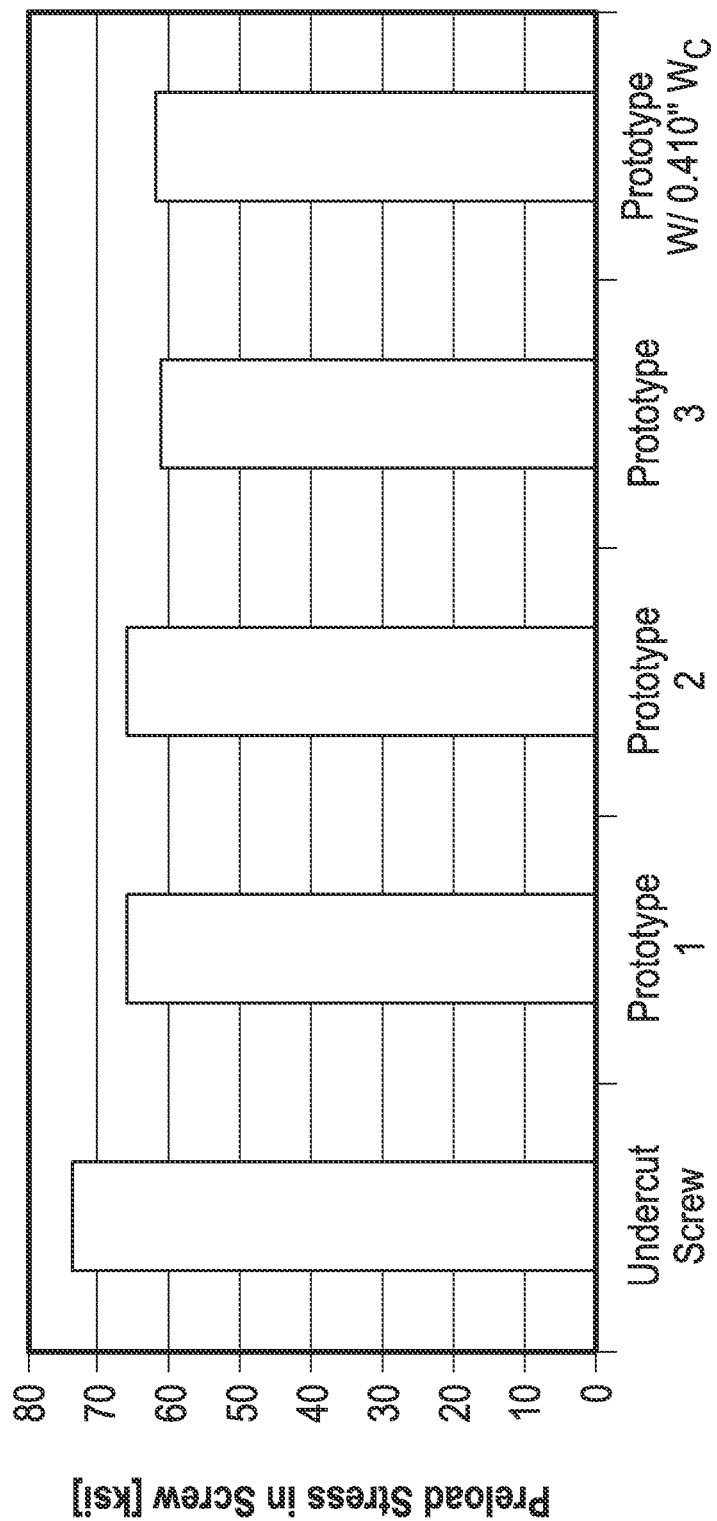
FIG. 8 is a graph showing preload stresses in ksi for a variety of weight screw designs.

For each of the embodiments disclosed herein, the width $W_C$ of the cylindrical portion 24 is preferably between 0.350 inches and 0.800 inch, and more preferably between 0.390 and 0.450 inch. This range of width preserves the stability of the weight screw 10 within the weight port without sacrificing discretionary mass, especially in lighter weight screws 10. It also reduces the preload stress of the weight screw 10 during engagement with a weight port, as shown in FIG. 8 in contrast with a commercially available undercut screw.

Figure 9:
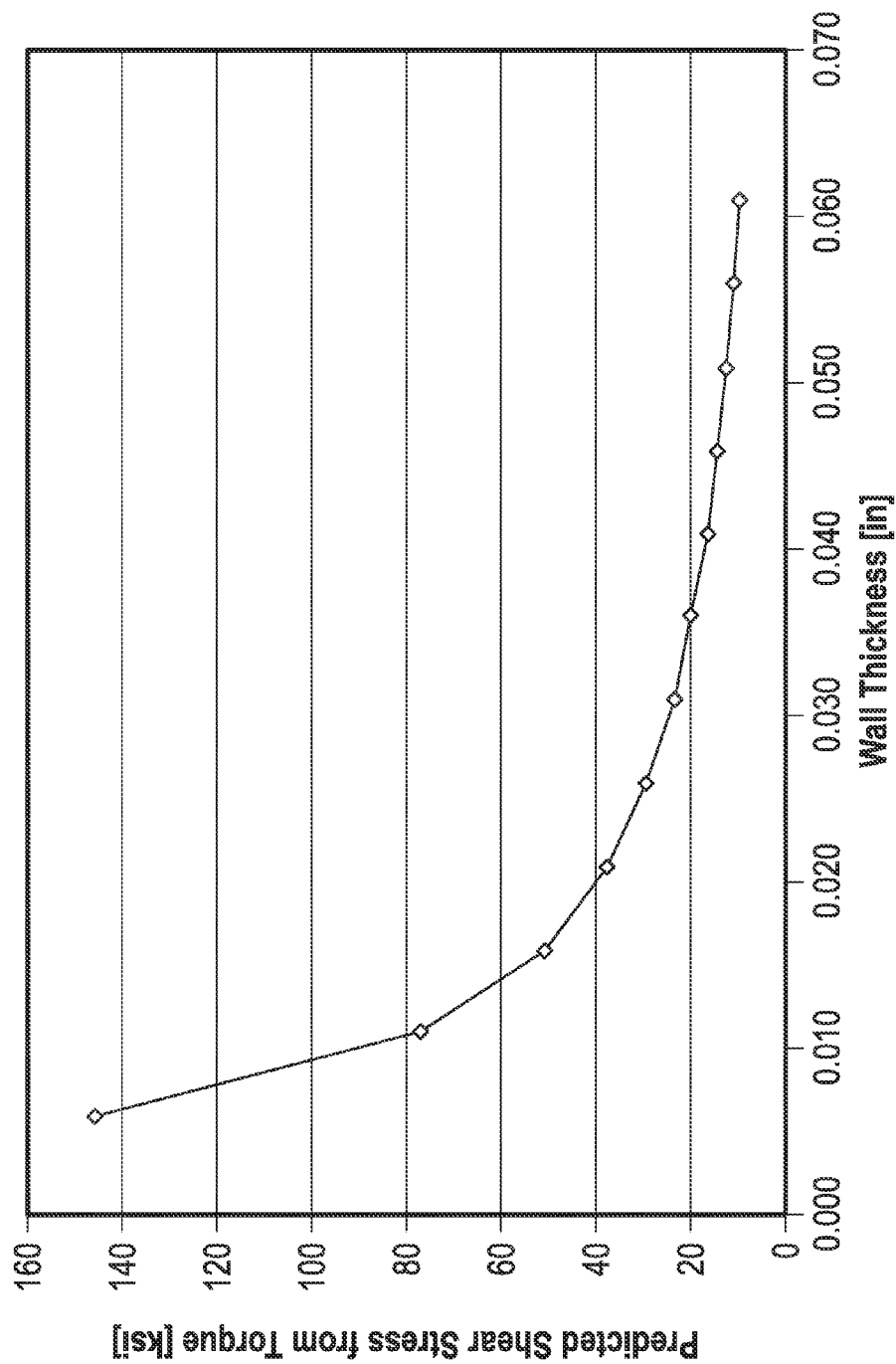
FIG. 9 is a graph showing the relationship between wall thickness and predicted shear stress from torque in ksi.

For each of the embodiments disclosed herein having a counterbore 35, it is preferred that there be a wall 45 (shown in FIG. 6) between the counterbore 35 and the engagement bore 26 having a thickness of at least 0.020 inch, and more preferably between 0.035 and 0.040 inch. The graph in FIG. 9 demonstrates that the wall 45 protects the weight screw 10 against undue shear stress, which can be caused by torque when the weight screw is being screwed into a weight port.

The weight screws 10 of the present invention may be provided to consumers in the form of a golf club weighting set. Each weight screw 10 in the set may be composed of a different material, may comprise (or lack) a counterbore 35, may include holes 27 in the cylindrical portion 24, and may have different dimensions $W_C$, $L_A$, $L_B$ and $L_C$. Preferably, each weight screw 10 in the set has the same overall length L but a different overall weight in grams. For example, a set could include the weight screws 10 described in Table 1, each of which has the same overall length L:

TABLE 1

| Target Weight (g) | $L_B$ (inches, ± 0.003") | $W_C$ (inches, ± 0.001") | Material |
|---|---|---|---|
| 2 | 0.175 | 0.394 | Aluminum 7075 |
| 3 | 0.158 | 0.450 | Aluminum 7075 |
| 4 | 0.095 | 0.450 | Aluminum 7075 |
| 5 | 0.010 | 0.450 | Aluminum 7075 |
| 6 | 0.110 | 0.450 | Titanium 6-4 |
| 7 | 0.057 | 0.450 | Titanium 6-4 |
| 8 | 0.010 | 0.450 | Titanium 6-4 |
| 9 | 0.157 | 0.450 | Stainless steel 17-4 |
| 10 | 0.127 | 0.450 | Stainless steel 17-4 |
| 11 | 0.096 | 0.450 | Stainless steel 17-4 |
| 12 | 0.066 | 0.450 | Stainless Steel 17-4 |

The weight screws of the present invention may be sold to the consumer as a set, each weight screw in the set having an upper portion 22, cosmetic features, and threaded extension portion 30 with identical dimensions, such that each weight screw fits within a standard weight port, but each weight screw 10 having a different overall weight based upon the material from which it is made, the dimensions of the cylindrical extension portion 24, the presence or absence of holes 27 and a counterbore 35, and/or the dimensions of the tail portion 40.

Multi-Material Weight Screw

Manufacturers traditionally have had difficulty creating a weight screw having a weight of less than 2 grams that withstands the standard stresses associated with weight screw and golf club head technology. Another aspect of the present invention is a low-weight screw 100 that has at least some of the dimensions and cosmetic features of the other weight screws 10 described herein such that it can be included in a weight screw set with the other weight screws 10, and also has sufficient structural integrity to withstand shear and torque stresses.

Figure 10:
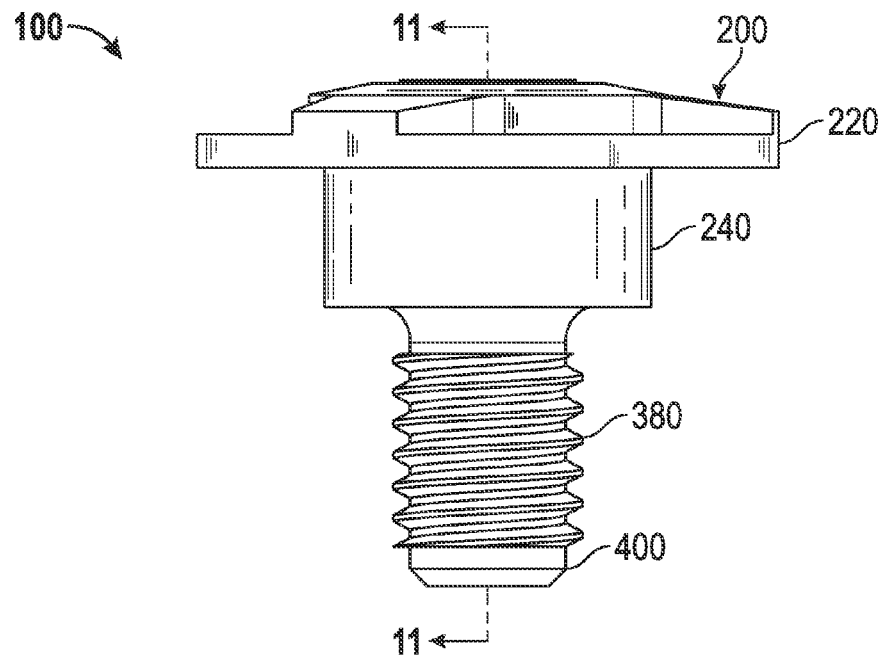
FIG. 10 is a side plan view of a fourth embodiment of the present invention.
Figure 11:
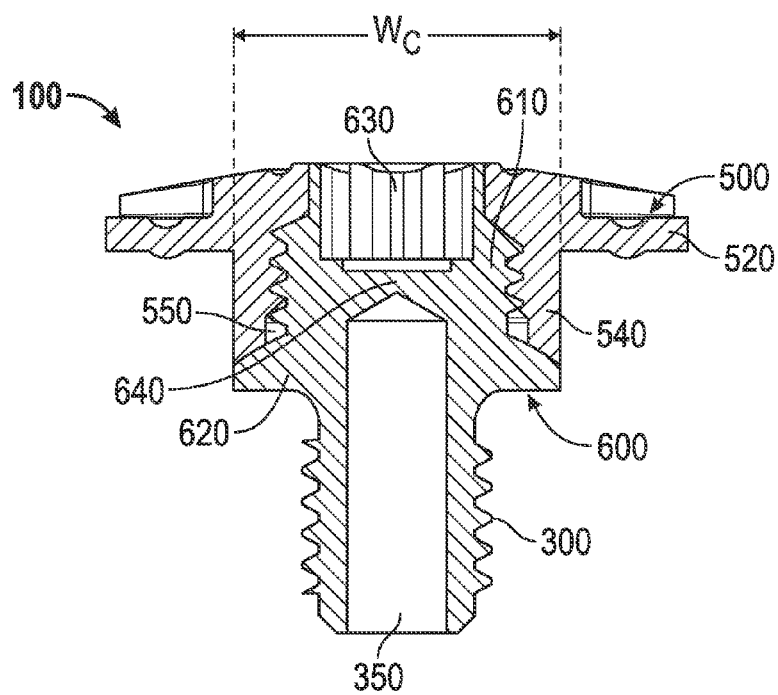
FIG. 11 is a cross-sectional view of the embodiment shown in FIG. 11 along lines 11-11.

The low-weight screw 100 of the present invention is shown in FIGS. 10-11. When viewed in its final assembled form, as shown in FIG. 10, the low-weight screw 100 looks nearly identical to the other weight screws 10 described herein. The low-weight screw 100 of the present invention has a head 200 with an upper portion 220 and a cylindrical portion 240 and a threaded extension portion 300 with a tail portion 400 and preferably counterbore 350. The low-weight screw preferably has some of the same dimensions as those of the other weight screws 10 disclosed herein, particularly the size of the threads of the threaded extension portion 300 (M6×1.0) and the size of the upper portion 220 of the head 200.

As shown in FIG. 11, the low-weight screw is preferably formed of two pieces: a cap 500 made of a lightweight material such as, but not limited to, a plastic or composite, and preferably an injection molded plastic; and a support screw 600 made of a lightweight material, such as, but not limited to, metal alloys, and preferably an aluminum alloy.

The lightweight cap 500 makes up much of the head 200 of the low-weight screw 100, as it includes an upper portion 520 that snugly fits within a weight port (not shown) and a cylindrical lower portion 540. The upper portion 520 and cylindrical lower portion 540 may have any of the dimensions $L_A$, $L_B$, and $W_C$ disclosed herein. The lightweight cap 500 further includes a central through-bore 550 having internal threads sized to receive threads, preferably with dimensions of M8×1.0.

The support screw 600 comprises the threaded extension portion 300 of the low-weight screw 100, including the counterbore 350, and also includes a docking extension 610 having external threads, preferably with dimensions of M8×1.0. The upper portion of the docking extension 610 includes an engagement bore 630 that receives the end of a screwdriver or torque wrench. The support screw 600 preferably includes a wall 640 between the engagement bore 630 and the counterbore 350 of at least 0.025 inch, and more preferably between 0.030 and 0.040 inch.

The support screw 600 further comprises a lateral stop portion 620 against which the cylindrical lower portion 540 of the lightweight cap 500 rests when it is fully engaged with the docking extension 610. The lateral stop portion 620, which preferably has a maximum width that is equal to the width $W_C$ of the cylindrical lower portion 540, rests against the bottom of a weight port when the low-weight screw 100 is fully engaged with the weight port.

The low-weight screw 100 is assembled by threading the docking extension 610 of the support screw 600 into the central bore 550 of the lightweight cap 500 and screwing the lightweight cap 500 onto the docking extension 610 of the support screw 600 until the cylindrical lower portion 540 of the lightweight cap 500 abuts the stop portion 620 of the support screw 600. Preferably, the central bore 550 is coated with an adhesive material, such as epoxy, before the lightweight cap 500 is engaged with the docking extension 610 to further ensure that the lightweight cap 500 does not disengage with the support screw 600 during use. The threads and adhesive within the central bore 550 allow the lightweight cap 500 to be attached to the support screw 600 without the need for press fitting.

Figure 12:
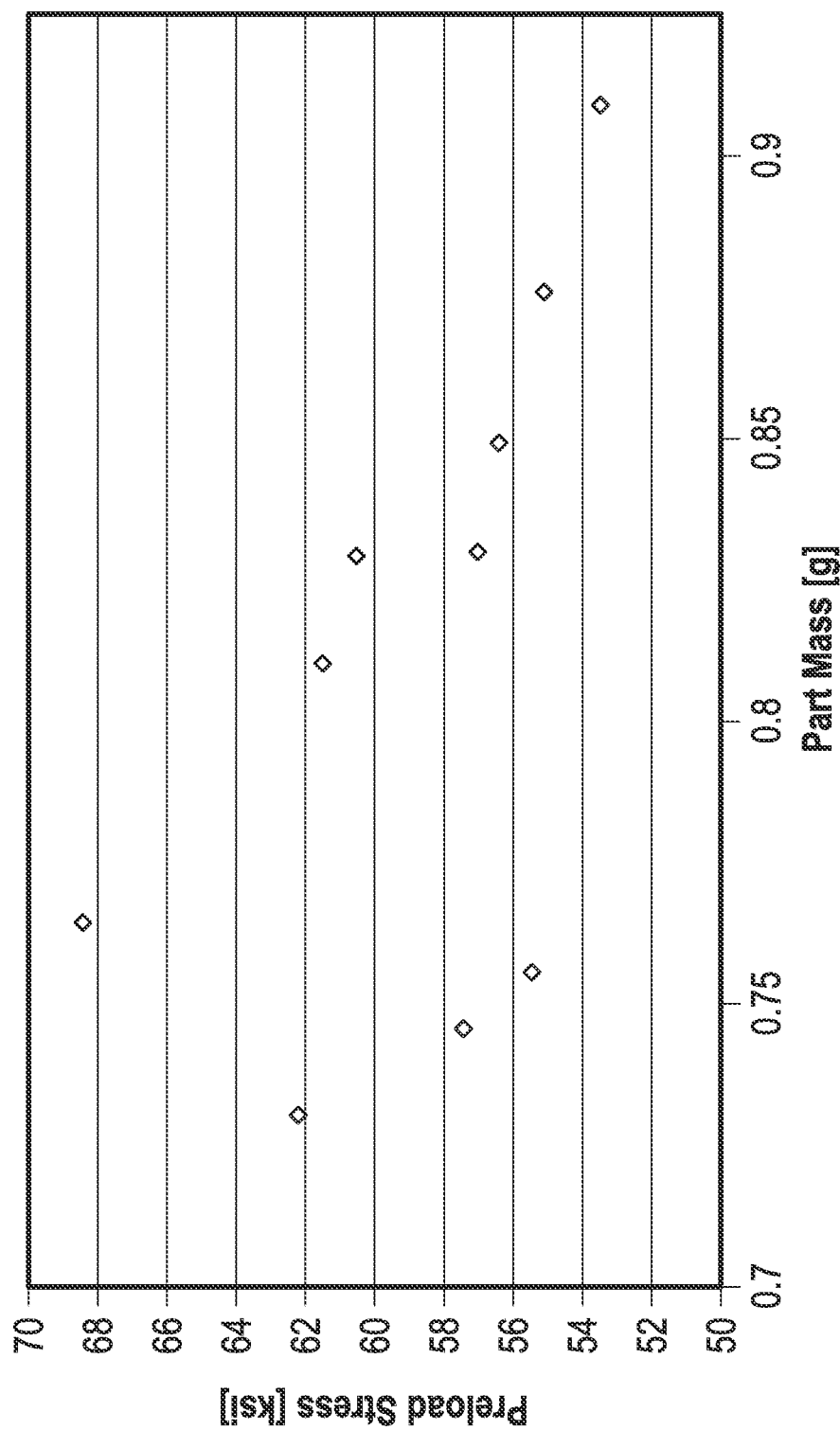
FIG. 12 is a graph showing preload stresses associated with alternative designs for a piece of the embodiment shown in FIG. 11.

FIG. 12 shows the preload stresses placed on various prototypes of the support screw 600, each of which has a different mass in grams. Preferably the support screw has a mass less than 0.8 grams and a preload stress of less than 64 ksi.

The low-weight screw 100 of the present invention preferably has a weight of less than 2 grams and can be included in a set of weight screws 10 to provide an ultra-low weight option to consumers who wish to fill one or more weight ports of a golf club with a very light weight screw.

Customizable Medallion

For each of the embodiments disclosed herein, including single and multi-material screws 10, 100, the cosmetics may be customized as shown in FIGS. 13A-16. In each embodiment, only an upper face or surface 21, 210 of the upper portion 22, 220 of the weight screw 10, 100 is visible when the weight screw is engaged with a weight port. Typically, if a manufacturer wishes to change the cosmetics of a weight screw 10, 100, it must produce a new tool for the entire weight screw 10, 100 and then produce an entirely new set of weight screws 10, 100 regardless of its inventory of old screws 10, 100, which can be both wasteful and expensive.

Figure 14:
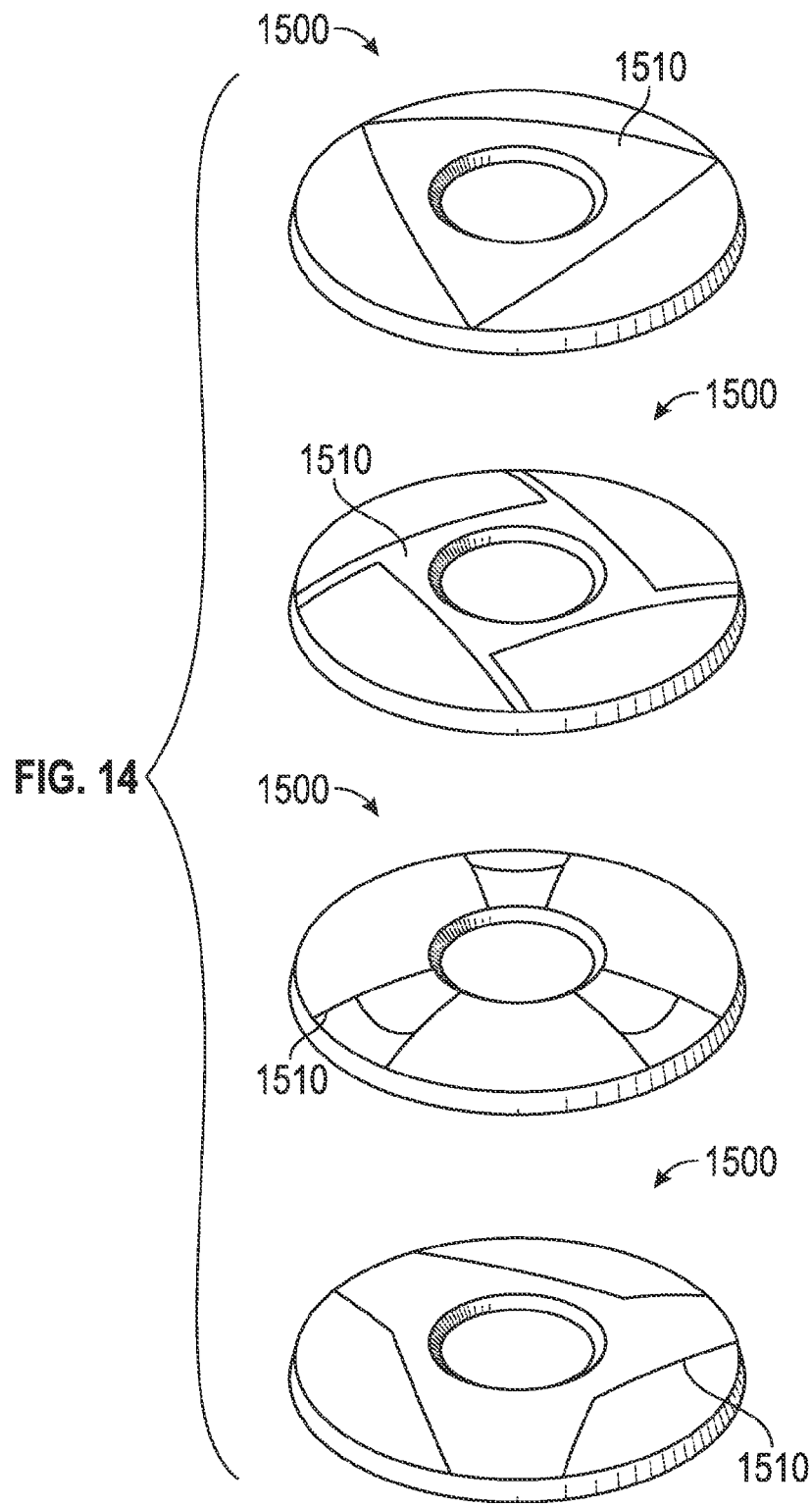
FIG. 14 is a side perspective view of four medallions, each having a different surface design feature.
Figure 15:
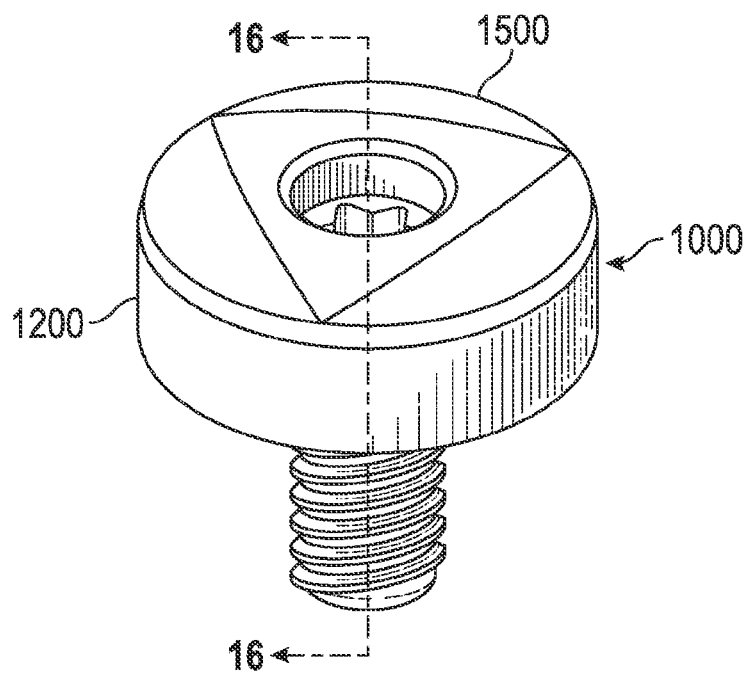
FIG. 15 is a side perspective view of the sixth embodiment shown in FIG. 13B engaged with one of the medallions shown in FIG. 14.
Figure 16:
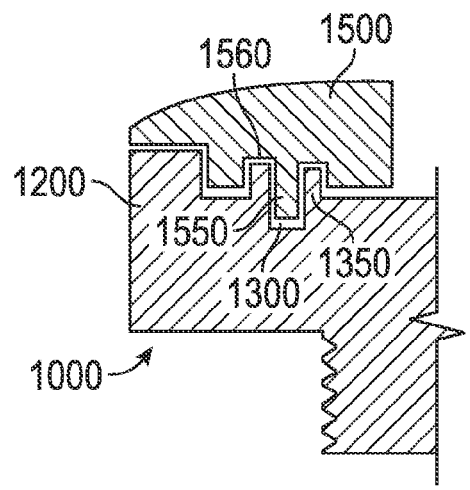
FIG. 16 is a partial cross-sectional view of the embodiment shown in FIG. 15 along lines 16-16.

As shown in FIGS. 13A-16, in preferred embodiments of the present invention, the weight screw 1000 further includes a customizable upper surface 1100 sized to receive a medallion 1500. The customizable upper surface 1100 preferably includes an engagement bore 1400, which can be coplanar with the upper surface 1100 as shown in Figure 13A or may protrude upwards as shown in FIGS. 13B and 13C. The customizable upper surface 1100 also preferably comprises a recess 1250 in the upper portion 1200 of the weight screw 1000, or it may be a flat surface 1260. In another embodiment, shown in FIG. 13B, the upper surface 1100 may include a flat surface 1260 along with recesses 1300 and/or mating protrusions 1350, and the medallion 1500 may include mating protrusions 1550 and/or recesses 1560, as shown in FIG. 16, allowing the medallion 1500 to removably snap on to the upper surface 1100 of the weight screw 1000. As shown in FIG. 14, the manufacturer can select a medallion 1500 from any number of designs and then affix the selected medallion 1500 to the upper surface 1100. Thus, when a product changes and requires a weight screw with a different design, the manufacturer needs only to dispose of old medallions 1500, not the underlying weight screw 10.

The medallion 1500 preferably is composed of electroformed metal, though in alternative embodiments it may be made of plastic, composite, rubber, or any type of formed, cast, forged, stamped, etc. metal material. The medallion 1500 preferably is permanently affixed to the upper surface 1100 with glue or other adhesive, though in alternative embodiments it may be brazed, welded, or mechanically affixed to the upper surface 1100. In alternative embodiments, the medallion 1500 may be removably affixed to the upper surface 1100 with a semi-permanent adhesive material, the mating protrusions 1350, 1550 and recesses 1300, 1560 referenced above, or a mechanical fastener. The medallion 1500 can be selected for use with a given weight screw 1000 based upon a design feature 1510 that is visible or accessible to the user when the weight screw 1000 is fully engaged with a weight port. For example, the design feature 1510 may be a pattern, as shown in FIG. 14, one or more colors, a surface texture, or an image.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A weight screw for a golf club head having at least one weight port, the weight screw comprising:
   a head;
   a medallion; and
   an extension portion comprising external threads,
   wherein the head comprises:
      an upper portion sized to close the at least one weight port; and
      an engagement bore,
   wherein the extension portion is disposed beneath the upper portion,
   wherein the head and extension portion are integrally formed,
   wherein the upper portion comprises a recessed region sized to receive the medallion, and wherein the engagement bore protrudes from the upper portion, and the engagement bore protrudes through the medallion when the medallion is received in the upper portion.

2. The weight screw of claim 1, wherein the medallion is composed of electroformed metal.

3. The weight screw of claim 1, wherein the medallion is composed of a non-metal material.

4. The weight screw of claim 1, wherein the extension portion comprises a counterbore.

5. The weight screw of claim 1, wherein the medallion is affixed within the recessed region with an adhesive material.

6. A weight screw for a golf club head having at least one weight port, the weight screw comprising:
   a head;
   a medallion; and
   an extension portion comprising external threads,
   wherein the head comprises:
      an upper portion sized to close the at least one weight port; and
      an engagement bore,
   wherein the extension portion is disposed beneath the upper portion, and
   wherein the upper portion comprises a recessed region sized to receive the medallion,
   wherein the engagement bore protrudes from the upper portion, and the engagement bore protrudes through the medallion when the medallion is received in the upper portion.

7. A weight screw for a golf club head having at least one weight port, the weight screw comprising:
   a head;
   a medallion comprising a first plurality of mating features; and
   an extension portion comprising external threads,
   wherein the head comprises:
      an upper portion sized to close the at least one weight port; and
      an engagement bore,
   wherein the extension portion is disposed beneath the upper portion,
   wherein the upper portion comprises an upper surface having a second plurality of mating features,
   wherein the first plurality of mating features releasably mates with the second plurality of mating features to removably affix the medallion to the upper surface, and wherein the engagement bore protrudes from the upper portion, and the engagement bore protrudes through the medallion when the medallion is received in the upper portion.

8. The weight screw of claim 7, wherein each of the first and second plurality of mating features comprise a plurality of recesses and a plurality of protrusions.

9. The weight screw of claim 7, wherein the medallion is composed of electroformed metal.

10. The weight screw of claim 7, wherein the extension portion comprises a counterbore.

11. A kit comprising:
a weight screw comprising a head and a threaded extension portion; and
a plurality of medallions,
wherein the head is integrally formed with the threaded extension portion,
wherein the head comprises an upper surface having the same shape and diameter as each of the plurality of medallions, the head comprises an engagement bore,
wherein each of the plurality of medallions comprises a design feature that differs from a design feature of each of the other medallions,
wherein each of the plurality of medallions comprises means for removably fixing the medallion to the upper surface,
wherein the upper portion comprises a recessed region sized to receive the medallion, and wherein the engagement bore protrudes from the upper portion, and the engagement bore protrudes through the medallion when the medallion is received in the upper portion.

12. The kit of claim 11, wherein the means for removably fixing the medallion to the upper surface is selected from the group consisting of a plurality of mating features and a semi-permanent adhesive.

13. The kit of claim 11, wherein at least one of the plurality of medallions is composed of electroformed metal.

14. The kit of claim 11, wherein at least one of the plurality of medallions is composed of a non-metal material.

15. The kit of claim 11, wherein the design feature is selected from the group consisting of a surface texture, a color, a pattern, and an image.

16. The kit of claim 11, wherein the threaded extension portion comprises a counterbore.

17. The kit of claim 11, wherein the weight screw is composed of a plurality of materials.

18. The kit of claim 11, wherein the weight screw is composed of a single metal material.

* * * * *